US006541076B2

(12) United States Patent
Dunkle

(10) Patent No.: US 6,541,076 B2
(45) Date of Patent: Apr. 1, 2003

(54) METHOD OF PRIMING SMC PARTS

(75) Inventor: Robert Dunkle, New Lexington, OH (US)

(73) Assignee: Patent Holding Company, Fraser, MI (US)

( * ) Notice: Subject to any disclaimer, the term of this patent is extended or adjusted under 35 U.S.C. 154(b) by 0 days.

(21) Appl. No.: 09/742,877

(22) Filed: Dec. 20, 2000

(65) Prior Publication Data

US 2001/0018467 A1 Aug. 30, 2001

Related U.S. Application Data

(63) Continuation-in-part of application No. 09/467,586, filed on Dec. 20, 1999, now abandoned.

(51) Int. Cl.$^7$ .......................... B05D 1/00; B32B 27/00; C09D 5/24
(52) U.S. Cl. .................. 427/458; 427/466; 427/469; 427/519; 522/74; 522/71; 522/81; 428/411.1; 428/500
(58) Field of Search .............................. 428/411.1, 500; 522/31, 42, 46, 48, 53, 66, 71, 75, 81, 96, 107, 182, 174, 179; 252/511; 204/192.17, 192.14; 427/458

(56) References Cited

U.S. PATENT DOCUMENTS

| 4,170,664 A | 10/1979 | Spenadel et al. ............... 427/44 |
| 4,319,811 A | 3/1982 | Tu et al. ...................... 351/166 |
| 4,534,888 A | * 8/1985 | Cobbledick et al. .......... 252/511 |
| 4,576,560 A | 3/1986 | Herman ....................... 425/103 |
| 4,623,481 A | * 11/1986 | Huybrechts et al. .......... 252/511 |
| 4,634,602 A | 1/1987 | Sirkoch et al. ................ 427/44 |
| 4,745,012 A | 5/1988 | Lo ............................... 427/435 |
| 4,900,763 A | 2/1990 | Kraushaar .................... 522/14 |
| 4,932,978 A | 6/1990 | Gavend et al. ................ 8/436 |
| 4,959,189 A | 9/1990 | Rohrbacher et al. ......... 264/510 |
| 4,962,139 A | 10/1990 | Lo ............................... 523/468 |
| 4,999,334 A | 3/1991 | Mehta et al. ............... 503/226 |
| 5,001,000 A | 3/1991 | Rohrbacher et al. ........ 428/215 |
| 5,106,651 A | 4/1992 | Tyger et al. ................ 427/54.1 |
| 5,114,756 A | * 5/1992 | Mirabeau et al. ........... 427/379 |
| 5,128,391 A | 7/1992 | Shustack ....................... 522/92 |
| RE34,066 E | * 9/1992 | Yamamoto et al. ......... 252/511 |
| 5,282,887 A | * 2/1994 | Gay et al. .................... 106/261 |
| 5,453,451 A | 9/1995 | Sokol ........................... 522/42 |
| 5,490,893 A | 2/1996 | Enlow et al. |
| 5,523,337 A | * 6/1996 | Banerjee et al. ............. 523/436 |
| 5,614,581 A | * 3/1997 | Cobbledick et al. ........ 252/511 |
| 5,639,546 A | 6/1997 | Bilkadi ....................... 428/331 |
| 5,773,487 A | 6/1998 | Sokol ........................... 522/42 |
| 6,001,919 A | * 12/1999 | Yen et al. .................... 524/496 |

FOREIGN PATENT DOCUMENTS

WO    WO 97/45458    12/1997

OTHER PUBLICATIONS

UV Coatings v. SICO, U.S. Court of Appeals, Jul. 18, 2000.

* cited by examiner

*Primary Examiner*—Susan W. Berman
(74) *Attorney, Agent, or Firm*—Welsh & Katz, Ltd.

(57) ABSTRACT

A method of priming a sheet molding compound (SMC) part. The method includes applying a photopolymerizable priming composition to a surface of the SMC part. The priming composition includes a polymerizable component, a photoinitiating component, and a conductive component. The method also includes irradiating the priming composition with light to initiate a polymerization reaction. The priming composition polymerizes on the SMC part substantially without releasing volatile solvents.

25 Claims, 1 Drawing Sheet

METHOD OF PRIMING SMC PARTS

CROSS-REFERENCE TO RELATED APPLICATIONS

This Application is a continuation-in-part application of U.S. patent application Ser. No. 09/467,586 filed Dec. 20, 1999, now abandoned.

BACKGROUND OF THE INVENTION

The present invention involves a method of priming SMC parts. More particularly, the present invention comprises compositions and methods of priming SMC parts with a light curable, conductive priming composition.

Sheet molding compound (SMC) is a moldable composite material generally made up of an unsaturated liquid polyester resin, a low profile thermoplastic resin, an inert filler, a curing aid, and short lengths of glass fiber reinforcing materials. The constituents are mixed on a film of polyethylene or other material. The mixture is covered with a second film. The SMC sandwich (film-SMC-film) is allowed to age until the polyester resin matures to a putty-like consistency.

Prior to molding, the protective sheets are removed and the matured SMC is cut into pieces of appropriate size for a particular mold. The SMC pieces are laid on a bottom mold of a matched set of top and bottom compression molds in a compression press. Heated molds are closed to mold a part from the piece of SMC.

SMC parts are used in many types of products including vehicles, appliances, business equipment, and recreational equipment. In automotive applications, SMC parts are frequently used to replace sheet metal parts, such as fenders, doors, hoods, and roofs. Some of the advantages of SMC parts over metal parts are that SMC resists corrosion and deterioration from weathering that presents significant problems with the use of metals. SMC parts are more resistant to denting than metals. Furthermore, SMC parts can be economically molded into intricate parts that can not be done with metals.

Conley et al., U.S. Pat. No. 3,679,510 shows a lamination of a relatively thick thermoplastic sheet with a polyvinyl fluoride outer surface to an SMC sheet to form a laminate. Such laminates are not useful for many automotive and truck applications that require high modulus materials for rigidity and thermal stability such as automobile and truck hoods. Attempts to reduce the thickness of the thermoplastic layer with the methods taught by Conley et al. have resulted in imperfections caused by the glass fibers in the SMC layer extending through the surface of the parts. As such, parts formed using such a procedure are not acceptable to produce a class A surface for automotive or truck use.

After molding SMC into a desired shape, the surface of the SMC part may contain pits, porosity and/or microcracks. As such, SMC parts generally do have a smooth, shiny class A surface that can be readily finished or painted. However, pits, porosity and microcracks can require more than one primer coat application to obtain a defect free surface. To obtain a smooth, paintable surface of high quality, the surface of the SMC part is usually cleaned, primed, and then painted with one or more additional coats. These additional coats are often applied in an electrostatic spraying operation that needs the part being painted to be conductive. Examples of additional, finish, coats that can be applied after priming include primer/sealer coats, base color coats, and clear coats. Even with multiple primer coats using current conventional priming technology, unacceptable defects can appear later during the manufacturing process.

The painting methods used in the above application need to have good transfer efficiencies in order to provide coated (or painted) parts in a cost-effective way. Further, SMC parts, which are made of thermoset material, pose particular painting problems because materials and methods that work well with other body part material such as metal (including, but not limited to steel and aluminum) or thermoplastic materials do not necessarily work well with SMC parts. On the other hand, techniques that work with SMC parts generally work with metal parts, including steel parts in particular.

SMC parts are currently primed with solvent-based primers. Once the primers are applied to the SMC parts, the primed parts are placed in an oven. Heating cures the primer by causing the solvent to be evolved from the primed SMC parts. One problem associated with this process is that the solvent must be recovered rather than emitted to the atmosphere because of environmental concerns.

Additionally, problems develop when a portion of the solvent remains trapped in thepits, porosity, and microcracks. When the SMC parts are used, such as in an automotive body panel, heat causes any solvent that remains in the primer to be evolved. Evolution of the solvent creates small cracks in finish layers on the SMC parts. While these cracks are typically too small to see without magnification, the cracks eventually degrade the appearance and useful life of the SMC parts. If more than minimal quantities of solvent are trapped on the primed part, unacceptable "paint pops" can be created in the finished product, ruining the appearance of the part immediately. Such paint-related defects in final painted products commonly occur with established SMC part priming techniques.

Sokol, U.S. Pat. No. 5,773,487 describes a solvent-free, coating composition that is curable with ultraviolet light. The Sokol coating composition contains an acrylate mixture and a photoinitiator. The Sokol patent, however, does not disclose a conductive component that would make the invention of the Sokol patent useful in electrostatic spraying operations.

It would be beneficial to have compositions and methods to that address the needs still unfulfilled by the present methods for painting that use primers that, do not evolve volatile organic compounds that can harm the environment or require expensive manufacturing controls, have good transfer efficiencies, reliably produce low defect Class A surfaces, and are usable with good transfer efficiencies in electrostatic spraying operations. The present invention addresses some of these needs highlighted by the limitations of current methods, and offers further benefits that are described herein.

BRIEF SUMMARY OF THE INVENTION

Figure 1A:
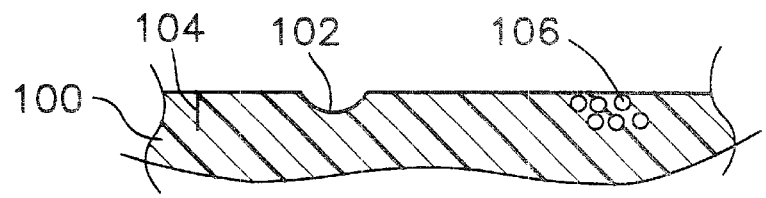
FIGS. 1a–d depicts cross-sections of an SMC substrate with various numbers of coats.

The present invention includes a method of priming a SMC part. The method includes applying a conductive, photopolymerizable priming composition to a surface of the SMC part. The method also includes irradiating the applied priming composition with light to initiate a polymerization reaction. The priming composition thereby polymerizes on the SMC part without releasing volatile solvents.

The priming composition includes a polymerizable component, a photoinitiating component, and a conductive component. The polymerizable component includes an acrylate mixture. The photoinitiating component initiates a polymerization reaction in the priming composition when the priming composition is exposed to light. The priming composition is curable upon exposure to light without requiring evaporation of a solvent from the priming composition.

DETAILED DESCRIPTION OF THE INVENTION

The present invention includes a method of priming SMC parts in particular with a conductive, substantially solvent-free priming composition. The priming composition includes a polymerizable component, a photoinitiating component, and a conductive component. What follows are descriptions of embodiments of the invention, however it should be understood that the invention is not limited to the descriptions of the embodiments contained herein.

The method of priming SMC parts is particularly suited for use in automotive applications because the conventional processes used in automotive manufacturing utilize electrical attraction between conductive paint having a charge and conductive parts having an opposite charge to apply the paint and other finishes to the parts. It should be noted that SMC raw parts are not necessarily conductive, and most are not. After an SMC part has been primed in accordance with the present invention, the surface of the SMC part will be conductive. That permits the part to be used in a subsequent electrostatic spraying operations to obtain high transfer efficiencies and superior results.

Further, the performance of SMC parts manufactured using the method of the present invention are superior to SMC parts primed with conventional primers because the substantially solvent-free formulation of the priming composition used in the method of the present invention substantially eliminates problems associated with the evaporation of any oil, alcohol or water-based solvent during the curing process. The lack of solvents addresses concerns with worker safety, environmental safety, and part performance problems associated with residual solvent. The process of the present invention thereby results in the efficient formation of SMC parts that exhibit superior finish durability characteristics than SMC parts primed with prior art methods The polymerizable component can be selected from monoacrylates, diacrylates, triacrylates, polyacrylates, urethane acrylates, polyester acrylates, and the like and combinations thereof. The polymerizable component preferably includes a mixture of at least two acrylates. Suitable acrylates include, but are not limited to, trimethylolpropane triacrylate, alkoxylated trimethylolpropane triacrylate, such as ethoxylated or propoxylated trimethyolpropane triacrylate, 1,6-hexane diol diacrylate, isobornyl acrylate, aliphatic urethane acrylates, vinyl acrylates, epoxy acrylates, ethoxylated bisphenol A diacrylates, trifunctional acrylic ester, unsaturated cyclic diones, polyester diacrylates, and combinations thereof.

To control pre-polymerization viscosity of the priming composition for sprayability, dipping or other means of application, it is possible to use low molecular weight monomers that not only take the place of organic solvents but also participate and contribute to final polymer properties. Preferred monomers to adjust the viscosity of the priming composition are low molecular weight mono or di-acrylates. The viscosity of the priming composition is desirably between about 2 and 1,500 centipoise at 25° C. and preferably between about 2 and 1,200 centipoise at 25° C. for most applications.

The polymerizable component preferably includes a first acrylate and a second acrylate. The first acrylate has a higher molecular weight than the second acrylate. The first acrylate is preferably a triacrylate and has a concentration of between about 68 and 84 percent by weight. The second acrylate is preferably a monoacrylate and has a concentration of between about 15 and 25 percent by weight. Percent by weight means the percentage of the specified component as a percentage of the weight of the priming composition.

The photoinitiating component used in the priming composition of the present invention can be of the free radical or cationic type. The photoinitiating component preferably has a concentration of between about 0.1 and 7 percent by weight. A combination of photoinitiators can be used. Suitable photoinitiators for use with the present invention include, but are not limited to, 1-phenyl-2-hydroxy-2-methyl-1-prop anone, oligo {2-hydroxy-2methyl-1-[4-(methylvinyl)phenyl]propanone}, 2-hydroxy 2-methyl 1-phenyl propan-1 one, bis (2,6-dimethoxybenzoyl)-2,4,4-trimethylpentyl phosphine oxide, 1-hydroxycyclohexyl phenyl ketone and benzophenone, and combinations thereof.

Other suitable photoinitiators include bis(n,5,2,4-cyclopentadien-1-yl)-bis[2,6-difluoro-3-(1H-pyrol-1-yl) phenyl] titanium and 2-benzyl-2-N,N-dimethylamino-1-(4-morpholinophenyl)-1-butanone. These photoinitiators both enable curing of the priming composition with visible sunlight and are available from Ciba-Geigy Corporation under the designations IRGACURE 784 DC and IRGACURE 369, respectively. These latter two initiators enable visible sunlight cure and high pigment loading cure.

Still other photoinitiators that are suitable for use with the present invention include 2-methyle-1-[4(methylthio)-2-morpholinopropan]1-one, 4-(2-hydroxy) phenyl-2-hydroxy-2-(methylpropyl)ketone, 1-hydroxy cyclohexyl phenyl ketone benzophenone, (n-5,2,4-cyclopentadien-1-yl) [1,2,3, 4,5,6-n)-(1-methylethyl) benzene]-iron(+) hexafluorophosphate (−1), 2,2-dimethoxy-2-phenyl-1-acetophen-one 2,4,6-trimethyl benzoyl-diphenyl phosphine oxide, benzoic acid, 4-(dimethyl amino)-ethyl ether, and combinations thereof.

The conductive component is finely ground so that the conductive component does not detrimentally affect the appearance of the primed SMC part. The conductive component is preferably carbon black. However, a person of ordinary skill in the art will appreciate that other finely ground metallic materials or combinations of conductive materials can be used for the conductive component. The conductive component should be present at a level such that when a part has been primed with the priming composition the part is amenable to further painting by electrostatic spraying operations. The concentration of the conductive component can be between about 0.1 and 5 percent by weight.

A preferred priming composition includes between about 65 and 85 percent propoxylated trimethylol propane triacrylate, between about 15 and 25 percent isobornyl acrylate, between about 0.1 and 7 percent of a photoinitiator that is a mixture of bis (2,6-dimethylbenzoyl) 2,4,4-trimethylpentyl phosphine oxide and 2-hydroxy-2-methyl-1-phenyl-propan-1-one, which is available from Ciba-Geigy Corporation under the designation IRGACURE 1700, and between about 0.1 and 5 percent of carbon black.

The priming composition can also include a pigment or other coloring agent to provide the primer with a desired color. Selection of an appropriate pigment is within the skill of the art based upon the particular polymerizable component, photoinitiating component, and conductive component used in formulating the priming composition as well as the desired color of paint that is to be applied to the SMC part over the primer.

The priming composition is sprayed over the SMC part so that a substantially even layer of the priming composition covers the surface of the SMC part. A person of ordinary skill in the art will appreciate that it is possible to apply more than one layer of priming composition depending on the surface of the SMC part. Other possible methods of application include brushing, curtain coating, dipping, and rolling.

The priming composition of the present invention has the ability, under proper conditions, to be applied, cured, and sanded or burnished within the span of one minute and is then ready for repeated cycles. As such, five or ten coats can be applied in as many minutes.

The priming composition is cured by a rapid polymerization reaction that is initiated by the photoinitiating component from exposure to an energy source, which is either direct sunlight, ultraviolet light, or election beam energy. Preferably curing is performed with ultraviolet light. The length of time that the part is exposed to the light is selected based upon the type of primer, the thickness of the primer layer as well as the intensity and type of light used in the curing process.

The priming composition used in conjunction with the method of the present invention is a significant improvement over the prior art SMC coating compositions because the present priming composition does not contain any significant water or organic solvent that must be evaporated before curing is complete. Rather, the priming composition used in conjunction with the method of the present invention includes low molecular weight polymerizable monomers and/or oligomers that are polymerized upon exposure to light. Therefore, the priming composition of the present invention is much less hazardous to the environment than the previously available compounds, which included organic solvents that had to be evaporated from the primer to cure the finish.

As noted, the present invention enables the production of a substantially solvent-free priming composition. The present invention enables the elimination of non-reactive solvents, such as water, alcohols, and volatile organics. However, minor amounts of such can be included without deleteriously affecting the present invention.

After curing, the priming composition of the present invention lends improved paintability to the primed SMC part over prior art non-conductive ultraviolet-cured coatings and improved performance characteristics of the final painted part over prior art solvent-based primers. Not wishing to be bound by theory, it is believed that the absence of substantial residual solvent is a significant factor in observed reductions in the formation of paint pops, microcracks, and other defects observed in the final products of conventional, solvent-based SMC priming technology. The primer coat of the present invention has good adhesion to the SMC part.

Because the primer layer is conductive, the primed part is conductive and can be used in electrostatic spraying operations. This conductivity is important to obtaining high transfer efficiency for a coat of paint being laid over the primer. Further, the absence of solvent lessens the harm to the environment and results in parts exhibiting fewer flaws both in the factory and in their end use. Parts primed in accordance with the present invention have been tested. In manufacturing the test parts, electrostatic spraying techniques were used to first prime the SMC parts in conformity with the description above with three different surface thicknesses (low, normal, and high). Each of those thicknesses were cured at three different intensities (low, normal, and high) yielding nine different combinations of primer thickness and cure. The parts were then given final automotive paint finishes. The resulting painted parts evidenced no immediate defects such as, but not limited to, paint pops or microcracks.

In adhesion tests, according to ASTM test methods, where a tape was laid over a surface that has been scratched in a crosshatched pattern on the finished parts and the tape was removed, the parts showed minimal or no occurrence of chipping, flaking, or generally poor adhesion. The same parts exhibited superior resistance to chipping both in terms of the size of chips formed and the frequency with which chips formed. The parts also exhibited no blistering, dulling, or loss of adhesion when immersed in 32° C. water for 240 hours. The parts did not suffer coating delamination, cracking, checking, blistering, fading or chalking when tested for thermal durability. Further, when tested by thermal shock tests where the parts were immersed in 38° C. water for 4 hours, exposed to −29° C. air for three hours and then directly blasted with steam, no or minimal blistering or other detrimental effects were observed. These and other tests showed that the finished part primed in accordance with the present invention demonstrated superior Class A finishes.

EXAMPLES

FIG. 1a shows a cross section of a SMC substrate (or raw part or part) 100. The SMC substrate has a pit 102, a crack, 104, and a porous region 106. The SMC substrate 100 will normally be non-conducting.

Figure 1B:
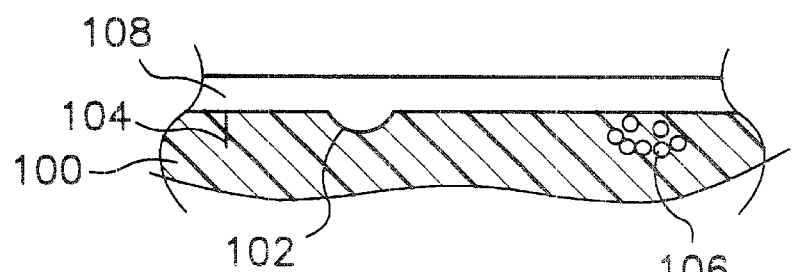

FIG. 1b shows a cross section of a SMC substrate 100 after it has been primed in accordance with the present invention. A substantially solvent-free conductive primer coat 108 with is adhered to the SMC substrate 100. The primer coat renders the coated SMC part conductive. Also, the priming composition fills or seals pits 102, cracks 104, and porous regions 106.

Figure 1C:
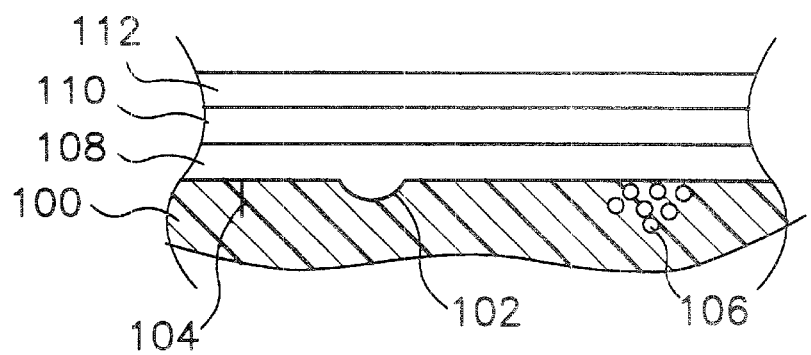

FIG. 1c, shows a standard three-layer coating as often used in the auto part industry.

FIG. 1c has the same features as FIG. 1b, except that a color coat 110 adheres to the primer coat 108, and in turn, a clear coat 112 adheres to the color coat.

Figure 1D:
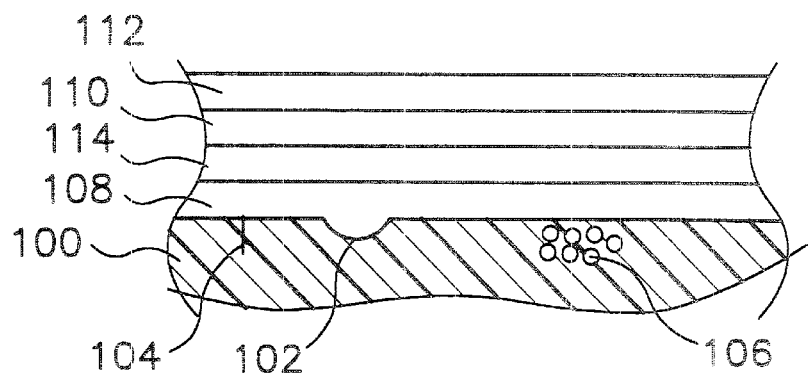

FIG. 1d, with most of the same features as FIG. 1c, except that FIG. 1d shows another application of the present invention where an optional primer/sealer 114 adheres to the priming composition 108. The color coat 110 adheres to the primer/sealer coat, and is turn adhered to by a clear coat 112.

Although the present invention has been described with reference to preferred embodiments, workers skilled in the art will recognize that changes can be made in form and detail without departing from the spirit and scope of the invention.

What is claimed is:

1. A method of priming a sheet molding compound (SMC) part, the method comprising:
    applying a photopolymerizable priming composition to a surface of the SMC part, wherein the priming composition comprises:
    a polymerizable component that contains a mixture of acrylates;

a photoinitiating component that initiates a polymerization reaction in the priming composition when the priming composition is exposed to light; and a finely ground conductive component; and irradiating the priming composition with light to initiate a polymerization reaction, wherein the priming composition polymerizes on the SMC part substantially without releasing volatile solvents.

2. The method of claim 1, wherein the acrylate mixture comprises a first acrylate and a second acrylate having a lower molecular weight than the first acrylate.

3. The method of claim 2, wherein the second acrylate is present in an effective concentration to produce a pre-polymerization viscosity of between about 2 and 1,500 centipoise at about 25° C.

4. The method of claim 1, wherein the polymerizable component is selected from the group consisting of polyester acrylates, urethane acrylate, monoacrylates, diacrylates, triacrylates, polyacrylates, and combinations thereof.

5. The method of claim 4, wherein the polymerizable component is selected from the group consisting of trimethylol propane triacrylate, 1,6-hexane diol diacrylate, aliphatic urethane acrylates, vinyl acrylates, epoxy acrylates, ethoxylated bisphenol A diacrylate, tri-functional acrylic ester, unsaturated cyclic diones, polyester diacrylates, alkoxylated trimethylolpropane triacrylate, isobornyl diacrylate, and combinations thereof.

6. The method of claim 1, wherein the polymerizable component has a concentration of between about 80 and 99.5 percent by weight.

7. The method of claim 1, wherein the photoinitiating component is selected from the group consisting of 1-phenyl-2-hydroxy-2-methyl-1-propanone, oligo{2 hydroxy-2 methyl-1-[4-(methylvinyl)phenyl]propanone}, 1-hydroxycyclohexyl phenyl ketone, benzophenones, thioxanthones, camphorphenones, cationic photoinitiators, and combinations thereof.

8. The method of claim 1, wherein the photoinitiating component has a concentration between 0.1 and 7 percent by weight based on the total weight of the priming composition.

9. The method of claim 1, wherein the conductive component is carbon black.

10. The method of claim 1, wherein the conductive component has a concentration of between about 0.1 and 5 percent by weight based on the total weight of the priming composition.

11. The method of claim 1, wherein the SMC part is a porous substrate such that the adhesion is promoted upon polymerization of the priming composition.

12. The method of claim 1, wherein the light is from ultraviolet light, sunlight, an electron beam, and combinations thereof.

13. A method of painting a sheet molding compound (SMC) part, the method comprising:

applying a photopolymerizable priming composition to a surface of the SMC part, wherein the priming composition comprises:
  a polymerizable component that contains a mixture of acrylates;
  a photoinitiating component that initiates a polymerization reaction in the priming composition when the priming composition is exposed to light; and
  a finely ground conductive component;

irradiating the priming composition with light to initiate a polymerization reaction, wherein the priming composition polymerizes on the SMC part substantially without releasing volatile solvents to form an electrically conductive primer coated SMC part; electrically charging the electrically conductive primer coated SMC part with a first electrical charge; and applying a compound having a second electrical charge, opposite to the first electrical charge, to the electrically conductive primer coated SMC part wherein the compound having the second electrical charge is attracted to the electrically conductive primer coated SMC part having a first electrical charge.

14. The method of claim 13, wherein the acrylate mixture comprises a first acrylate and a second acrylate having a lower molecular weight than the first acrylate.

15. The method of claim 14, wherein the second acrylate is present in an effective concentration to produce a pre-polymerization viscosity of between about 2 and 1,500 centipoise at about 25° C.

16. The method of claim 13, wherein the polymerizable component is selected from the group consisting of polyester acrylates, urethane acrylate, monoacrylates, diacrylates, triacrylates, polyacrylates, and combinations thereof.

17. The method of claim 16, wherein the polymerizable component is selected from the group consisting of trimethylol propane triacrylate, 1,6-hexane diol diacrylate, aliphatic urethane acrylates, vinyl acrylates, epoxy acrylates, ethoxylated bisphenol A diacrylate, tri-functional acrylic ester, unsaturated cyclic diones, polyester diacrylates, alkoxylated trimethylolpropane triacrylate, isoboronyl diacrylate, and combinations thereof.

18. The method of claim 13, wherein the polymerizable component has a concentration of between about 80 and 99.5 percent by weight based on the total weight of the priming composition.

19. The method of claim 13, wherein the photoinitiating component is selected from the group consisting of 1-phenyl-2-hydroxy-2-methyl-1-propanone, oligo{2 hydroxy-2-methyl-1-[-4-(methylvinyl)phenyl]propanone}, 1-hydroxycyclohexyl phenyl ketone, benzophenones, thioxanthones, camphorphenones, cationic photoinitiators, and combinations thereof.

20. The method of claim 13, wherein the photoinitiating component has a concentration between 0.1 and 7 percent by weight based on the total weight of the priming composition.

21. The method of claim 13, wherein the conductive component is carbon black.

22. The method of claim 13, wherein the conductive component has a concentration of between about 0.1 and 5 percent by weight based on the total weight of the priming composition.

23. The method of claim 13, wherein the SMC part is a substrate that has a defect selected from the group consisting of pits, porosity and microcracks such that the defect is sealed upon polymerization of the priming composition, wherein paintability is enhanced through the elimination of paint pops.

24. The method of claim 13, wherein the light is from ultraviolet light, sunlight, an electron beam, and combinations thereof.

25. The method of claim 13, wherein the compound having a second charge is selected from the group consisting of primer/sealer, color coat, and clear coat.

* * * * *